(12) United States Patent
Chui

(10) Patent No.: US 7,873,047 B2
(45) Date of Patent: Jan. 18, 2011

(54) METHOD AND APPARATUS FOR QUALITY OF SERVICE FOR PACKET COMMUNICATIONS

(75) Inventor: Timothy L. Chui, Fremont, CA (US)

(73) Assignee: Motorola, Inc., Schaumburg, IL (US)

( * ) Notice: Subject to any disclaimer, the term of this patent is extended or adjusted under 35 U.S.C. 154(b) by 1138 days.

(21) Appl. No.: 11/406,904

(22) Filed: Apr. 19, 2006

(65) Prior Publication Data

US 2007/0248023 A1    Oct. 25, 2007

(51) Int. Cl.
*H04L 12/26* (2006.01)
*H04L 12/58* (2006.01)

(52) U.S. Cl. .................... 370/392; 375/240; 709/231; 709/232

(58) Field of Classification Search ................ 370/400, 370/392, 252, 413, 412, 401, 231, 230, 395, 370/477, 471, 389, 232, 238, 393, 235, 352, 370/394, 516, 236, 249, 328, 224, 225; 710/105; 725/129; 709/223, 224, 225, 232, 231; 375/240; 455/452, 453, 459

See application file for complete search history.

(56) References Cited

U.S. PATENT DOCUMENTS

| | | | |
|---|---|---|---|
| 5,497,371 A * | 3/1996 | Ellis et al. ................ 370/412 |
| 6,021,440 A * | 2/2000 | Post et al. ................ 709/231 |
| 6,570,849 B1 * | 5/2003 | Skemer et al. .......... 370/230.1 |
| 6,608,815 B1 * | 8/2003 | Huang et al. ............. 370/232 |
| 6,650,650 B1 * | 11/2003 | Schneider et al. ......... 370/412 |
| 6,675,243 B1 * | 1/2004 | Bastiani et al. ............ 710/105 |
| 6,693,909 B1 * | 2/2004 | Mo et al. .................. 370/392 |
| 6,799,218 B1 | 9/2004 | McGovern |
| 6,934,249 B1 * | 8/2005 | Bertin et al. .............. 370/218 |
| 7,193,966 B2 * | 3/2007 | Gupta et al. .............. 370/231 |
| 7,522,609 B2 * | 4/2009 | Cohen et al. ........... 370/395.42 |
| 7,599,381 B2 * | 10/2009 | Shoham et al. ............ 370/413 |
| 2003/0069963 A1 * | 4/2003 | Jayant et al. .............. 709/224 |

(Continued)

OTHER PUBLICATIONS

Hatala, et al. Voice Over Frame Relay Implementation Agreement, FRF.11.1, Frame Relay Forum Technical Committee, Dec. 1998.

(Continued)

*Primary Examiner*—Pankaj Kumar
*Assistant Examiner*—Prenell P Jones
(74) *Attorney, Agent, or Firm*—Valerie M. Davis

(57) ABSTRACT

A packet communications system includes a method for maintaining quality of service by dynamically determining a maximum packet size for a communications system that transports at least one of real-time and time-sensitive data and other data in packets. Accordingly, a plurality of packets is received for transmission over a communications link. Either an encoder type or a packet size for the time-sensitive or real-time data packets is determined. A link speed for the communications link is determined. Based on the link speed and either the packet size or encoder type, a maximum packet size for any packets that do not include time-sensitive or real-time data is determined. Nominally, prior to transmission on the communications link, packets with non-real-time and non-time-sensitive data are fragmented into packets equal to or less than the maximum packet size. The maximum packet size may be dynamically reevaluated if the communications traffic or link characteristics change.

20 Claims, 5 Drawing Sheets

U.S. PATENT DOCUMENTS

| | | |
|---|---|---|
| 2004/0264488 A1 | 12/2004 | Yoon |
| 2005/0073997 A1* | 4/2005 | Riley et al. .................. 370/352 |
| 2005/0074007 A1* | 4/2005 | Samuels et al. ............. 370/392 |
| 2005/0251846 A1* | 11/2005 | Dravida et al. .............. 725/129 |
| 2006/0029080 A1* | 2/2006 | Kappler et al. ........... 370/395.4 |
| 2007/0064604 A1* | 3/2007 | Chen et al. .................. 370/230 |
| 2007/0115829 A1* | 5/2007 | Strutt et al. ................. 370/238 |
| 2007/0206497 A1* | 9/2007 | Plamondon et al. ......... 370/231 |

OTHER PUBLICATIONS

PCT International Search Report Dated Apr. 21, 2008.
"Frame Relay Fragmentation Implementation Agreement" FRF.12 Standard; 24 Pages.

* cited by examiner

METHOD AND APPARATUS FOR QUALITY OF SERVICE FOR PACKET COMMUNICATIONS

FIELD OF THE INVENTION

The invention generally relates to packet communications, and in particular, to insuring quality of service for real-time packet communications.

BACKGROUND OF THE INVENTION

In a packet communications system where diverse types of data utilize the same resources, some provisions are desirable for ensuring certain types of data are delivered in a timely manner. For real-time audio, for example, voice for a two-way conversation, such as a voice over IP (Internet protocol) or VoIP, it is desirable to have minimum delay and jitter. On the other hand, other data, for example a file download, may not have similar time or quality of service constraints.

One known method for ensuring a certain level of quality of service for a communications system with diverse data types is to set a priority level based upon the type of data being sent. For example, in such systems, a voice data packet has a higher priority for resources, such as a communications link, than a data packet that does not have real-time constraints. However, a priority scheme alone often does not provide the quality of service required. In one particular case, if a low priority packet consumes a link for an extremely long period of time, for example if the packet is relatively large, then a higher priority packet such as a voice packet that arrives for communication after a lower priority packet has obtained use of the link may be undesirably delayed. A known solution for this problem is to fragment all packets to be no greater than a certain size. That is, large packets are broken up and segregated into smaller packets of a certain size. This process of fragmentation is optimized by an a priori determination of a maximum or optimal packet size based on a size of the higher priority packets, a link speed, delay and jitter requirements.

Unfortunately, in a complex and diverse communications system, packet size, link speed, delay and jitter requirements often change or may not be known. In such situations, it is not possible to predict a priori an optimal fragmentation scheme.

Therefore, a need exists for an improvement to ensure a certain quality of service for diverse data types in packet systems where link speed, packet size, delay, jitter and other requirements vary or are unknown.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with embodiments of the present invention.

DETAILED DESCRIPTION OF EMBODIMENTS OF THE INVENTION

Figure 1:
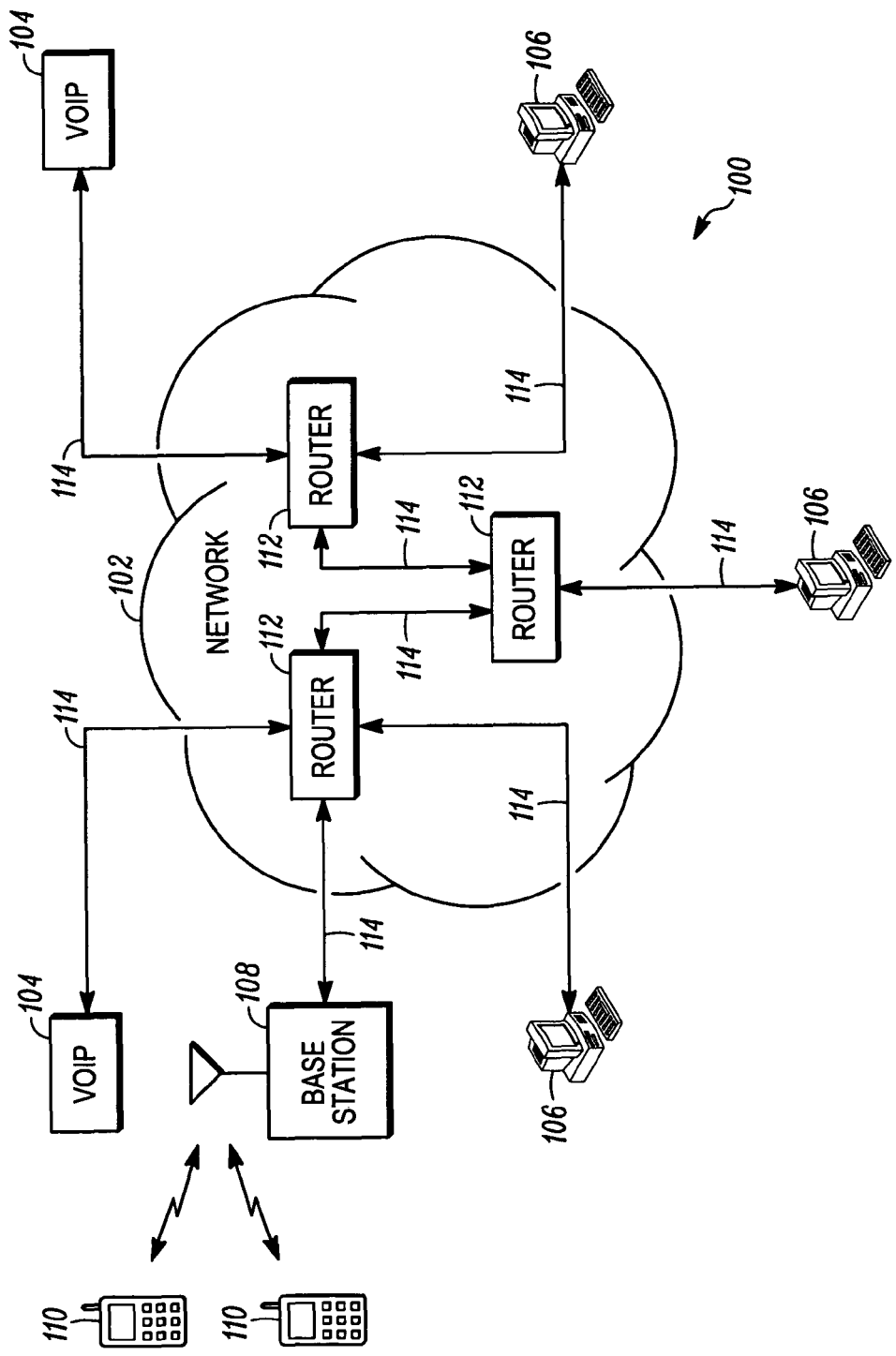
FIG. 1 is a block diagram of a packet communications system in accordance with an embodiment of the invention.

Before describing in detail embodiments that are in accordance with the present invention, it should be observed that the embodiments reside primarily in combinations of method steps and apparatus components related to a method and apparatus for providing quality of service in a packet communications system. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

It will be appreciated that embodiments of the invention described herein may be comprised of one or more conventional processors and unique stored program instructions that control the one or more processors to implement, in conjunction with certain non-processor circuits, some, most, or all of the functions of the method and apparatus for providing quality of service in a packet communications system described herein. The non-processor circuits may include, but are not limited to, transmitters, signal drivers, clock circuits, power source circuits, amplifiers and user input devices. As such, these functions may be interpreted as steps of a method to provide quality of service in a packet communications system as described herein. Alternatively, some or all functions could be implemented by a state machine that has no stored program instructions, or in one or more application specific integrated circuits (ASICs), in which each function or some combinations of certain of the functions are implemented as custom logic. Of course, a combination of these approaches could be used. Thus, methods and means for these functions are described herein. Further, it is expected that one of ordinary skill, notwithstanding some effort and many design choices motivated by, for example, available time, current technology, and economic considerations, when guided by the concepts and principles disclosed herein will be readily capable of generating such software instructions and programs and integrated circuits with minimal experimentation.

Pursuant to the various embodiments, a method for determining a maximum packet size for a communications system that transports time-sensitive and/or real-time data and other data in packets includes certain steps. The determined maximum packet size is used to provide quality of service in a packet communications system. The steps include receiving a plurality of packets for transmission over a communications link, determining an encoder type or a packet size for any packets that include real-time or time-sensitive data, determining a link speed for the communications link and determining a maximum packet size for any packets of the plurality of packets that do not include real-time or time-sensitive data. The maximum packet size is determined by the link speed and the encoder type or the packet size of packets that include time sensitive or real-time data.

Referring now to the drawings, and in particular FIG. 1, an embodiment of a packet communications system 100 is shown. Packet communications system 100 includes a packet network 102. Various communications and computing devices are coupled to packet network 102 for packet communications. Packet network 102 is for example an internet or intranet type network. The various communications and computing devices coupled to network 102 may use internet protocol (IP) to communicate with each other over network 102. Exemplary communications and computing devices shown in FIG. 1 include voice over IP (VoIP) terminals 104, computers 106 and base station 108, which provides communications access to wireless devices 110. Network 102 includes routers 112, which are coupled to each other and to the computing and communications devices using communications links 114. Communications links 114, which may be virtual or physical links, are any suitable communications links, including wireless links, and may be diverse in link speed and other characteristics. While network 102 is shown in FIG. 1 as comprising communications links 114 and routers 112, other components known to those of ordinary skill in the art, including switches, may comprise network 102.

Figure 2:
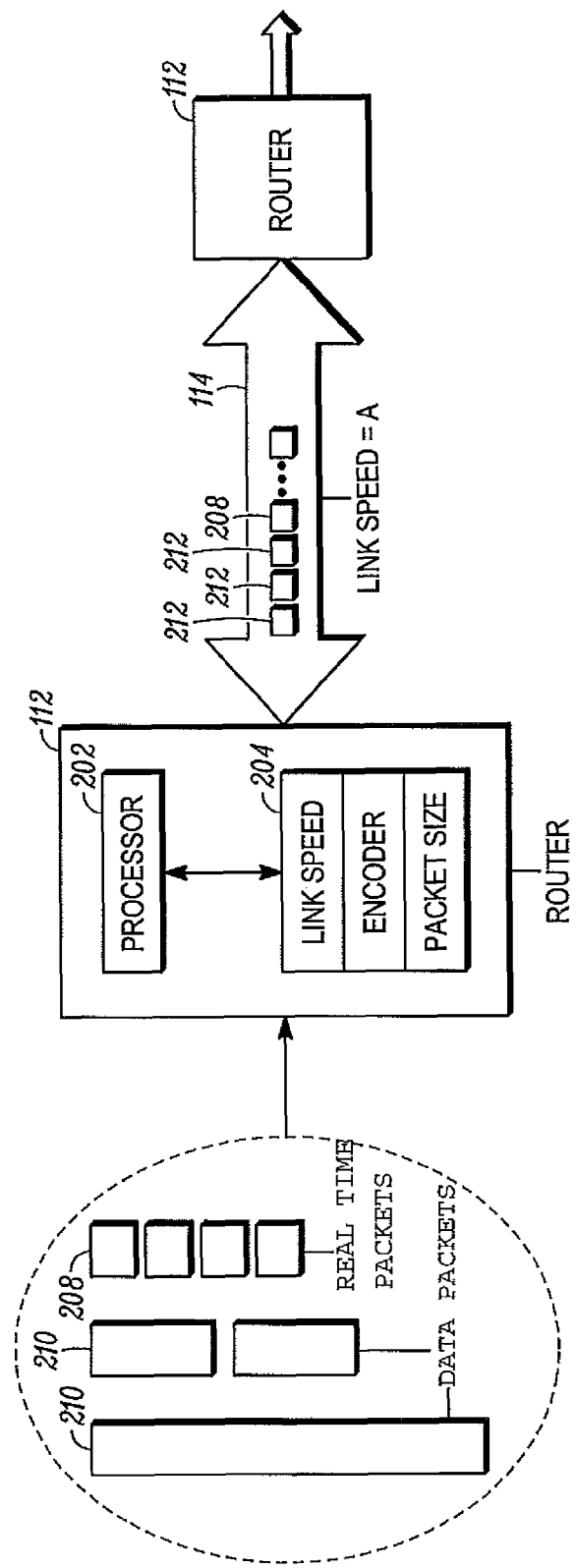
FIG. 2 is a block diagram illustrating a method for providing quality of service in a packet communications system in accordance with an embodiment of the invention.

FIG. 2 is a block diagram illustrating an embodiment of a method for providing quality of service in packet communications system 100. More specifically, FIG. 2 illustrates a method by which two routers 112 transmit packets over a communications link 114.

Exemplary details of a router 112 are shown in FIG. 2. Router 112 includes a processor 202 coupled to a memory 204. According to a stored program, the processor 202 in conjunction with memory 204 and other peripherals (not shown) controls operations of router 112. In other words, the processor 202, memory 204 and associated instructions serve as a controller for router 112. In one embodiment of the invention, memory 204 may store packets, a link speed, encoder type, packet size or other data.

According to one embodiment of the invention, a plurality of diverse packets is received by a router 112 for transmission over a link 114. The diverse packets are analyzed, in conjunction with certain characteristics of the link, to determine a maximum, optimal or nominal packet size desirable for the link. This determined packet size allows for quality of service to real-time or time-sensitive packets. The diverse packets include real-time or time-sensitive packets 208 and non-time-sensitive or data packets 210. To provide quality of service over communications link 114, data packets 210 may be converted into fragmented packets 212, i.e., packets of the determined packet size. Different communications links 114 may have different optimal fragmented packet sizes. The optimal size of fragmented packets is controlled dynamically according to embodiments of the invention. This insures that quality of service is provided dynamically on a per link basis and is adjustable for varying link or traffic characteristics.

Figure 3:
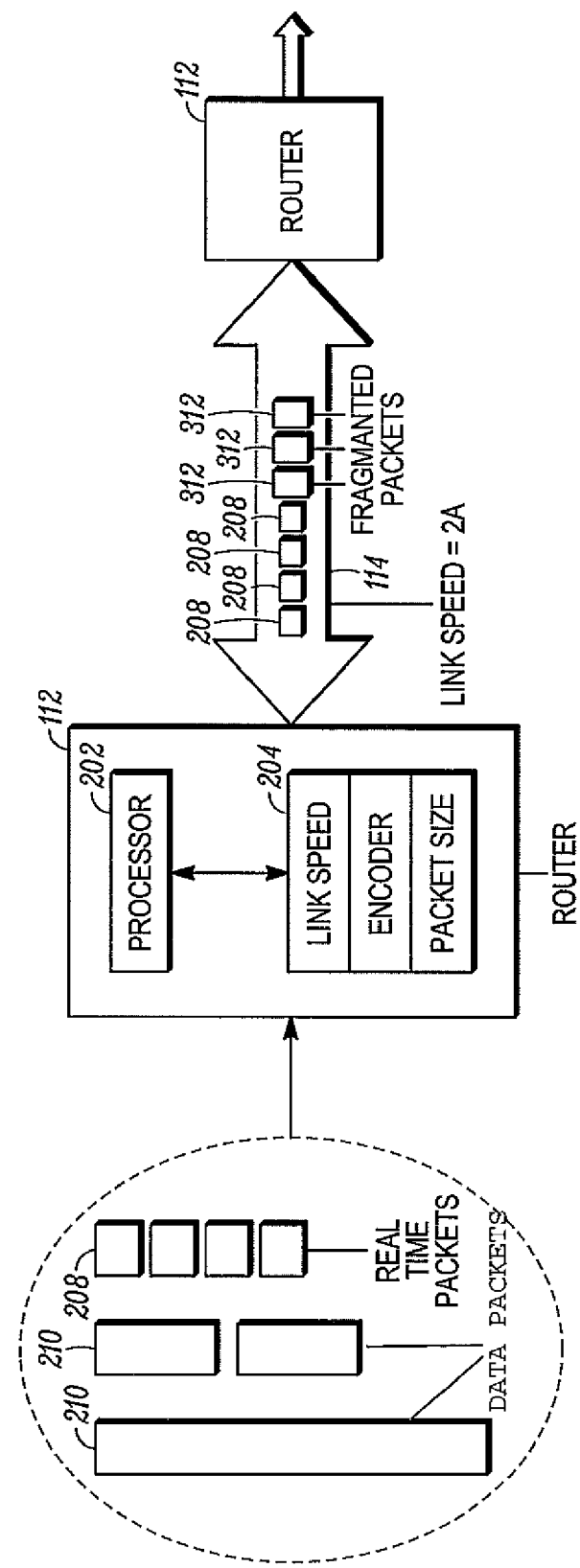
FIG. 3 is another block diagram illustrating a method for providing quality of service in a packet communications system in accordance with an embodiment of the invention.

FIG. 3 is similar in most respects to FIG. 2, as illustrated by the reuse of reference numerals. However, the link 114 of FIG. 2 has a link speed of A and the link 114 of FIG. 3 has a link speed of 2A. Also, the fragmented packets 312 created in FIG. 3 are different in size from the fragmented packets 212. A method for determining the size of the fragmented packets according to one embodiment of the invention is described below with respect to FIG. 4.

Figure 4:
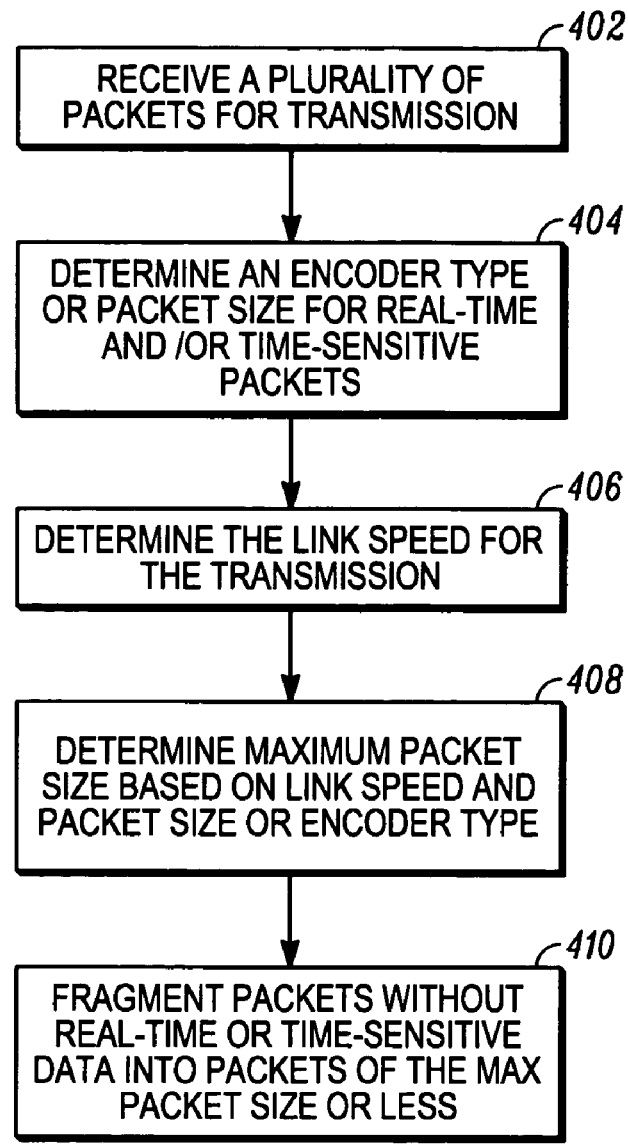
FIG. 4 is a flow diagram illustrating a method for providing quality of service in a packet communications system in accordance with an embodiment of the invention.

The method of FIG. 4 is implemented by any device that is coupled to a communication link. For system 100, routers 112 may implement the embodiment of the method of FIG. 4. Initially a plurality of packets are received for transmission over the communications link (402). Typically the packets are received from communications links 114, which may be diverse in characteristics, for example, protocol and link speed. The packets may include real-time or time-sensitive packets 208 or non-real-time and non-time-sensitive data packets 210. Real-time packets include packets associated with real-time communications, such as two-way voice communication or broadcast of music or audiovisual information. By way of example, one of the routers 112 shown in FIG. 1 receives packets from a base station 108, a VoIP terminal 104 and a computer 106. Base station 108 and VoIP terminal 104 provide real-time packets comprised of packetized speech data, video data, audio data, or other real-time data. On the other hand, computer 106 provides data or non-real-time packets, which may be for example, file downloads. Time sensitive packets are packets designated as being time sensitive or time critical, that is, packets that should be transmitted expediently, in a timely fashion. Time sensitive packets may include real-time or non-real-time data. Non-time-sensitive packets are packets designated as not being time critical or sensitive, that is, packets that do not have to be transmitted expediently or are less time sensitive relative to the time sensitive packets. Non-time-sensitive packets may include real-time or non-real-time data. By way of example, packets that include VoIP data may be designated time-sensitive, but packets of video data may be designated non-time-sensitive.

After receiving the packets for transmission (402), an encoder type or packet size is determined for the real-time or time-sensitive packets (404). In one embodiment, processor 202 makes this determination under the control of a stored program. In some embodiments an encoder type may be associated with a type of link, therefore permitting determination of the encoder type by its association with a type of link. In other embodiments the encoder type is encoded in the packet to be transmitted, or is otherwise determined by the packet format, thereby permitting dynamic analysis of the packet to determine the encoder type. In some embodiments the encoder type is known prior to transmission and stored. In some embodiments it may not be necessary or desirable to determine an encoder type for the real-time or time-sensitive packets. Instead a packet size for these packets may be determined. The packet size may be determined directly by analysis of a real-time or time-sensitive packet or a group of such packets. Packet size may be derived based on link speed and delay requirements. Most encoders produce a nominal, average or standard packet size based on the encoding algorithm employed. For example, in a system using a frame relay network, the average packet sizes for IMBE (Improved Multi Band Excitation), G-728 (an ITU-T standard for speech coding), and ACELP (Algebraic Code Excited Linear Prediction) encoders are 56 bytes, 130 bytes, and 50 bytes, respectively. Therefore, the packet size may be determined on the basis of the encoder type, as determined by any of the above methods, among others. Or, the packet size may be incorporated or encoded directly into the packet and determined by an analysis of the real-time or time-sensitive packet.

A link speed is determined for the link that will be used to transmit the packets (406). Typically the link speed is known a priori, but the link speed may be variable and determined by the router via analysis or by receipt of the link speed from another source. The exemplary links 114 of FIG. 2 and FIG. 3 have a fixed link speed that is stored in memory 204 for use by processor 202.

Based on the link speed and either a packet size or encoder type for the real-time or time-sensitive packets, a maximum, optimal or nominal packet size is determined for use in fragmenting non-real-time and non-time-sensitive data packets that do not have a strict quality of service, delay or jitter requirement (408). In one embodiment, the maximum packet size is determined in a manner to provide quality of service or other requirements for the real-time or time-sensitive packets. To insure quality of service for the real-time or time-sensitive packets, one embodiment of the method determines a base link speed. The base link speed may be the slowest expected link speed. The base link speed is compared with the actual link speed of the communications link that will be used to transmit the packets. See step 406. Then the maximum packet size is determined based on the result of this comparison. In some embodiments the comparison result is a ratio or approximate ratio of the actual link speed to the base link speed. In one embodiment the base link speed is 64 Kbps (Kilobits per second). In an embodiment where the comparison result is a ratio of the actual link speed to the base link speed, the maximum packet size may be the average packet size for real-time or time-sensitive packets multiplied by the ratio. Where there is more than one average size of real-time or time-sensitive packets, e.g., where the packets include real-time or time-sensitive data from more than one encoder or source, the smallest average packet size may be used to determine the maximum packet size.

After the maximum packet size is determined (408), then non-real-time and non-time-sensitive packets are resized or fragmented to be the maximum packet size, if the non-real-time and non-time-sensitive packets exceed the maximum packet size (410). The determined maximum packet size need not be static and may be dynamically reevaluated, per steps 402, 404, 406 and 408, if, for example, the communications traffic or link characteristics change. Fragmenting may include separating packetized data and replicating and/or modifying packet header information accordingly.

By way of example, if communications system 100 has a base link speed of A and link 114, of FIG. 2, which also has a link speed of A, is being used to transmit real-time or time-sensitive packets of size S, then a maximum packet size may be S, since the ratio of base link speed to actual link speed is 1. In this case, the maximum size of non-real-time and non-time-sensitive packets (212) is limited to S by fragmentation. On the other hand, if communications system 100 has a base link speed of A and link 114, of FIG. 3, which has a link speed of 2A, is being used to transmit real-time or time-sensitive packets of size S, then a maximum packet size may be 2S, since the ratio of actual link speed to base link speed is 2. In this case, the maximum size of non-real-time and non-time-sensitive packets (312) is limited to 2S by fragmentation. Of course, the maximum packet size need not be a strict maximum and it may be desirable in some cases, for example, where link utilization is low, to permit non-real-time and non-time-sensitive packets to exceed the maximum packet size. There is no requirement that the actual link speed(s) be a multiple of the base link speed, as in the exemplary links in FIG. 2 and FIG. 3. However, it is often the case that the actual link speed is a multiple of the base link speed. This will simplify determining a maximum or optimal size for fragmented packets in some embodiments.

Figure 5:
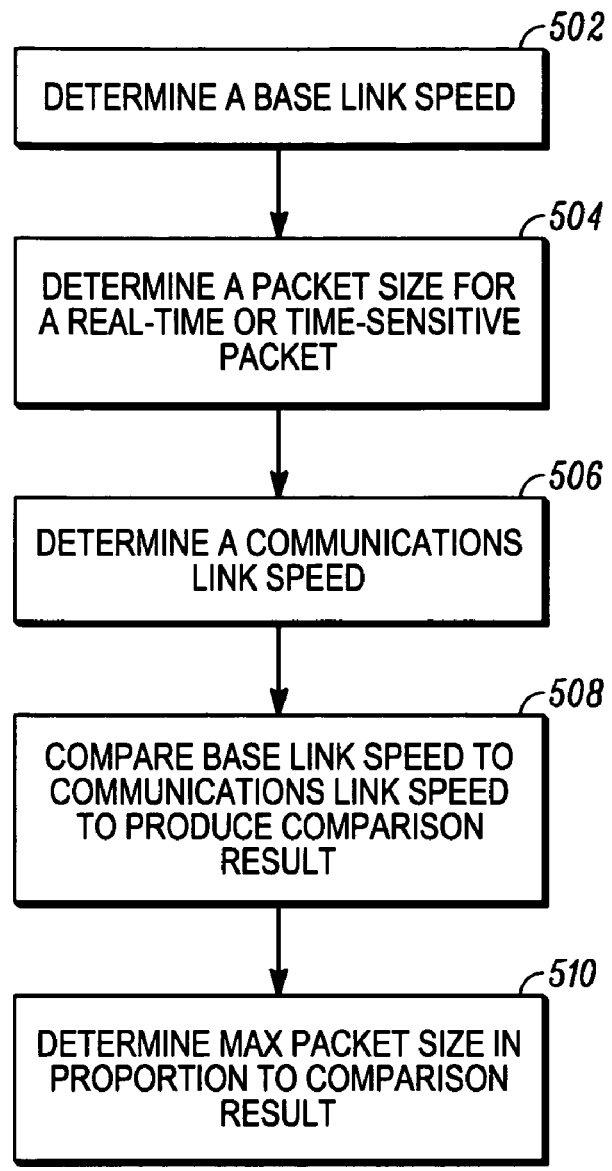
FIG. 5 is a flow diagram illustrating a method for selecting a maximum or optimal packet size to provide quality of service in accordance with an embodiment of the invention.

FIG. 5 is a flow diagram illustrating an embodiment of the present invention for determining a maximum or optimal packet size for use in fragmenting packets. According to the method, a base link speed is determined (502). The base link speed is determined in any known manner, including the exemplary methods described above with respect to step 406. Then a packet size of a real-time or time-sensitive packet is determined (504). As discussed above with reference to step 406, the packet size may be determined on the basis of the encoder type, or the packet size may be incorporated or encoded directly into the packet and determined by an analysis of the time-sensitive packet. The communications link speed for the link that will transport the packets is determined (506). Any known method for determining the communications link speed is used, including the exemplary methods described above with respect to step 406. The determined base link speed (502) and the determined communications link speed (506) are compared to produce a comparison result (508). This comparison is made in any known manner, including determining a ratio of the communications link speed to the base link speed. Then the comparison result is used to determine a maximum or optimal packet size in proportion to the comparison result (510). For example, where the comparison result is a ratio of the communications link speed to the base link speed, the maximum or optimal packet size may be the determined packet size multiplied by the comparison result. The maximum or optimal packet size may be used to fragment all packets traveling over the communications link to be no larger than the maximum or optimal packet size. According to the principles of the present invention, quality of service is achieved for a communications link that transports real-time or time-sensitive data packets by determining an optimal or maximum packet size for non-real-time and non-time-sensitive data packets. The non-real-time and non-time sensitive packets are fragmented prior to transmission over a communications link so that the transmitted packets are no larger than the optimal or maximum packet size. The maximum packet size is determined based on the link speed and the characteristics of the real-time or time-sensitive packets using the communications link. Advantageously, the fragmentation permits a desired level of quality of service and is flexible enough to account for varying link characteristics and varying traffic over the link. Also, where there are multiple encoders and varying jitter requirements, a desired level of quality of service is achieved without precise knowledge of all jitter requirements.

In the foregoing specification, specific embodiments of the present invention are described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

What is claimed is:

1. A method for determining a maximum packet size for a communications system that transports at least one of real-time and time-sensitive data and other data in packets, the method comprising the steps of:
receiving a plurality of packets for transmission over a communications link;
determining at least one of an encoder type and a packet size for any packets that include real-time or time-sensitive data;
determining a link speed for the communications link;
determining a maximum packet size for any packets of the plurality of packets that do not include real-time or time-sensitive data, wherein the maximum packet size is determined by the link speed and one of the encoder type and packet size of any packets that include real-time or time-sensitive data, wherein the determined maximum packet size for the packets that do not include real-time or time-sensitive data allows a quality of service requirement to be met for the real-time or time-sensitive data.

2. The method of claim 1 further comprising the steps of:
fragmenting any packets of the plurality of packets that do not include real-time or time-sensitive data such that any packets of the plurality of packets that do not include real-time or time-sensitive data do not exceed the maximum determined packet size.

3. The method of claim 2 wherein the step of determining a maximum packet size includes the steps of:
determining a base link speed;
comparing the base link speed to the link speed for the communications link to determine a comparison result; and
determining the maximum packet size based on the comparison result.

4. The method of claim 3 wherein the step of determining the maximum packet size further includes determining the maximum packet size based on a characteristic of a packet of the plurality of packets that include real-time or time-sensitive data.

5. The method of claim 4 wherein the maximum packet size is based on an average packet size of any of the plurality of packets that include real-time or time-sensitive data.

6. The method of claim 4 wherein the plurality of packets includes packets that are encoded with a plurality of encoders and the maximum packet size is determined based on an encoder of the plurality of encoders that generates a smallest packet size.

7. The method of claim 4 wherein the plurality of packets includes packets that are encoded with a plurality of encoders for at least one of real-time and time-sensitive data and the maximum packet size is determined based on an encoder of the plurality of encoders that generates a smallest average packet size.

8. The method of claim 3 wherein the maximum packet size changes in proportion to the comparison result.

9. An apparatus for attaining a quality of service by determining a maximum packet size for a communications system that transports at least one of real-time and time-sensitive data and other data in packets, the apparatus comprising:
a memory for receiving a plurality of packets for transmission over a communications link; and
a controller that:
determines one of an encoder type and a packet size for any packets that include real-time or time-sensitive data;
determines a link speed for the communications link; and
determines a maximum packet size for any packets of the plurality of packets that do not include real-time or time-sensitive data, wherein the maximum packet size is determined by the link speed and one of the encoder type and packet size of any packets that include real-time or time-sensitive data, wherein the determined maximum packet size for the packets that do not include real-time or time-sensitive data allows a quality of service requirement to be met for the real-time or time-sensitive data.

10. The apparatus of claim 9 wherein the controller also:
fragments any packets of the plurality of packets that do not include real-time or time-sensitive data such that any packets of the plurality of packets that do not include real-time or time-sensitive data do not exceed the maximum packet size.

11. The apparatus of claim 10 wherein when the controller determines a maximum packet size, the controller:
determines a base link speed;
compares the base link speed to the link speed for the communications link to determine a comparison result; and
determines the maximum packet size based on the comparison result.

12. The apparatus of claim 11 wherein when the controller determines the maximum packet size, the controller determines the maximum packet size based on a characteristic of a packet of the plurality of packets that includes real-time or time-sensitive data.

13. The apparatus of claim 12 wherein the maximum packet size is an average packet size of any of the plurality of packets that include real-time or time-sensitive data.

14. The apparatus of claim 12 wherein the plurality of packets includes packets that are encoded with a plurality of encoders and the maximum packet size is determined based on an encoder of the plurality of encoders that generates a smallest packet size.

15. The apparatus of claim 12 wherein the plurality of packets includes packets that are encoded with a plurality of encoders for at least one of real-time and time-sensitive data and the maximum packet size is determined based on an encoder of the plurality of encoders that generates a smallest average packet size.

16. The apparatus of claim 9 wherein the maximum packet size changes in proportion to the comparison result.

17. A method for determining a maximum packet size for a communications system that transports time-sensitive data and other data in packets, the method comprising the steps of:
determining a base link speed;

determining a packet size for a packet encoded by an encoder;

determining a communications link speed;

comparing the base link speed with the communications link speed to produce a comparison result;

determining a maximum size for packets transmitted over the communications link in proportion to the comparison result, wherein the determined maximum size for the packets allows a quality of service requirement to be met for the time-sensitive data.

18. The method of claim 17 wherein the step of comparing the communications link speed with the base link speed includes dividing the communications link speed by the base link speed to produce the comparison result, and wherein the maximum packet size is determined by multiplying the comparison result by a size of a packet of time-sensitive data.

19. The method of claim 18 wherein the size of a packet of time-sensitive data is one of: a minimum size of a packet of time-sensitive data from the encoder and an average size of a packet of time-sensitive data from the encoder.

20. The method of claim 1 further comprising the step of determining a different maximum packet size for the packets that do not include real-time or time-sensitive data based on a change in at least one of the link speed, or the encoder type or packet size of the packets that include real-time or time-sensitive data.

* * * * *